Oct. 25, 1949.　　　　B. KOBACK　　　　2,485,743
TRAILER HITCH
Filed March 6, 1946
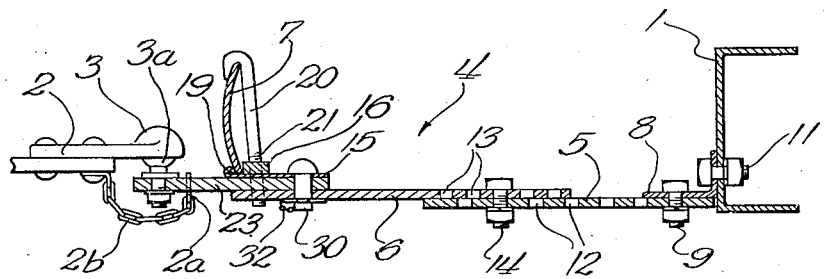
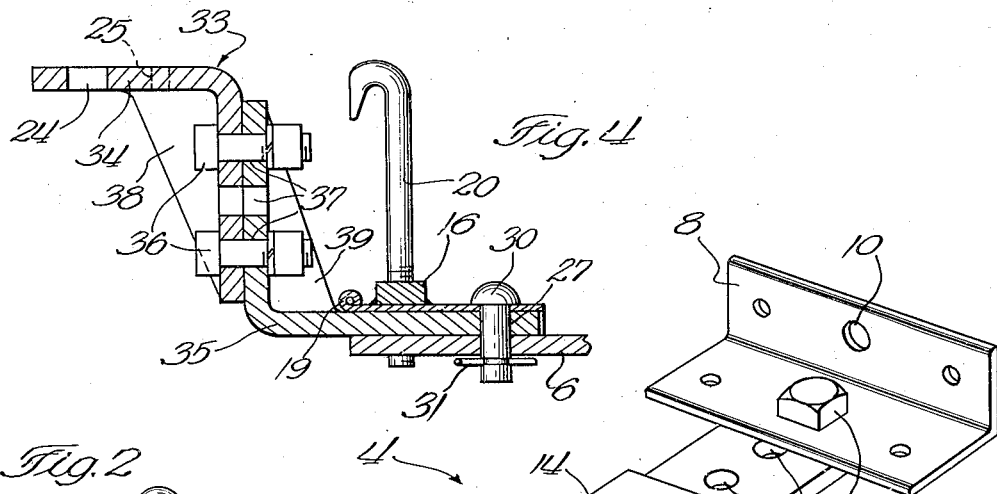
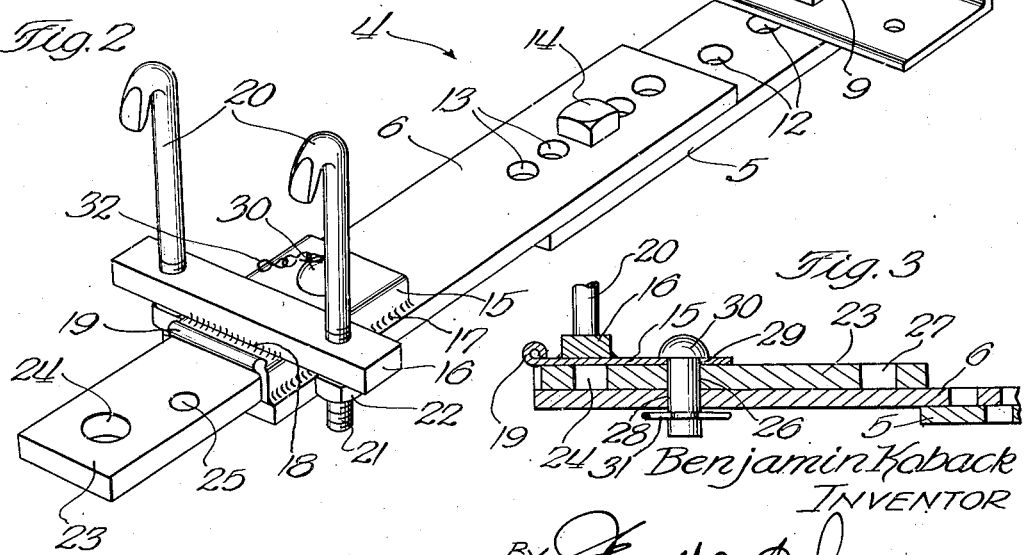
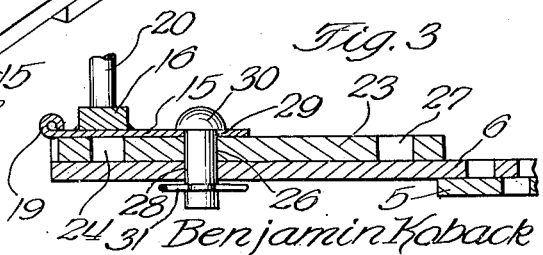
Benjamin Koback
INVENTOR
By Harold D. Cook
ATTORNEY Patented Oct. 25, 1949

2,485,743

UNITED STATES PATENT OFFICE 2,485,743

TRAILER HITCH

Benjamin Koback, Portland, Oreg., assignor to Richard J. Driggs, Portland, Oreg.

Application March 6, 1946, Serial No. 652,397

11 Claims. (Cl. 280—33.44)

1

This invention relates to a novel and improved trailer hitch, and has as its general object the provision of a device which may be attached to standard makes of automotive vehicles and the like for towing trailers therebehind.

Other objects of the invention are to provide a device of the type described which may easily be attached to an automotive vehicle without the use of special tools and without weakening or in any way impairing the general usefulness or appearance of the vehicle to which it is attached.

Another object is to provide a trailer hitch which is economical to manufacture, which is adjustable to fit different vehicles, and which is rugged and reliable in service.

A particular object is to provide a trailer hitch so constructed and arranged that there will be no portion thereof extending or protruding behind the rear bumper of the vehicle to which it is attached when the hitch is not in use, to avoid the usual objectionable extension of conventional trailer hitches behind the rear bumper.

In the present construction the trailer hitch comprises a drawbar made in two parts for attachment to a passenger automobile or truck. One of the drawbar members is adapted to be bolted to a transverse or other frame member of the vehicle, and the other drawbar member is provided with a clamp which may be secured to the rear bumper. The two drawbar members are connected together by means having a length adjustment to fit the space between the bumper and frame member on different vehicles so that the draft is transmitted directly to the vehicle frame without imposing a pulling or tractive stress upon the bumper. Conventional trailer hitches ordinarily project permanently behind the bumper when the trailer is removed so as to constitute a hazard to people walking behind the vehicle and especially in walking between parked cars. Such a projection increases the length of the vehicle so as to cause annoyance in parking and sometimes to prevent the closing of garage doors on a garage which is just long enough to accommodate the bumper to bumper length. Such a projection also constitutes a hazard to the car behind, both in parallel parking on the street and in moving traffic, wherein the projection often causes damage to the car behind in a slight rear end bump which would be only a harmless incident if the projection were not present. In the present construction the objectionable projection behind the bumper is removed when the trailer is disconnected to restore the bumper to

2 its original effectiveness in fending off such bumps, and to restore the vehicle to its normal bumper to bumper length. To this end the drawbar is equipped with an extension member which may either be removed with withdrawing a simple pin connector or which may be telescoped into a guide box on the drawbar and retained therein by reinserting the pin in a different hole. This is accomplished without tools and without crawling under the vehicle to remove or loosen any parts attached thereto. The present hitch may thereby remain permanently attached to the vehicle without hazard or annoyance, and it is at all times instantly available for use in pulling trailers.

The invention resides in the construction and arrangement of parts illustrated by way of example in the preferred embodiments shown on the accompanying drawings and described in the annexed specification. Additional objects and advantages will become apparent as the description proceeds with particular reference to the preferred embodiments illustrated, and it is to be understood, of course, that all modifications of the present embodiments within the scope of the appended claims are included in the invention.

In the drawings:

Figure 1 is a view in longitudinal section of the present trailer hitch showing its construction and manner of attachment to a bumper equipped automotive vehicle of standard make;

Figure 2 is a perspective view of the trailer hitch as it appears before it is attached to a vehicle;

Figure 3 is a longitudinal sectional view of the rear end of the device, showing the manner in which the drawbar extension may be retracted so as not to extend behind the rear bumper of the vehicle; and Figure 4 illustrates a modification having an offset elevated drawbar extension for use with vehicles having unusually low rear bumpers.

In Figure 1 the numeral 1 designates a transverse member usually found at the rear of an automobile frame which is sufficiently rigid and secure and otherwise suited for the attachment of a trailer hitch. The numeral 2 designates a trailer tongue or drawbar having the usual spherical socket 3 for attachment to a trailer hitch. The device of the present invention is indicated, generally, by the reference numeral 4, and comprises a pair of adjustable drawbar members 5 and 6 extending between the automobile frame member 1 and the bumper 7, and provided with means of attachment to the trailer socket 3. In the present embodiment the forward end of the bar 5 is connected with a bracket or angle iron 8 by means of a bolt 9, and this bracket is in turn provided with a hole 10 to receive a bolt 11 attaching the device to the frame member 1. It is to be understood, however, that the bracket 8 may take other forms to adapt the device for attachment to different types of automobile frames or bodies. The bar 5 is provided with a series of holes 12, and the bar 6 is provided with a similar series of more closely spaced holes 13 to establish a plurality of length adjustments in small increments when the two bars are connected together by a bolt 14 passing through a pair of these holes which have been brought into registry.

By reason of the different spacing of the holes 12 and 13 there will always be one of the holes 13 in approximate registry with one of the holes 12, so that the length adjustment will very closely, if not exactly, fit any bumper spacing without requiring the holes 12 and 13 to be formed in precise positions for a particular make of car. Furthermore, it is desirable to make the length adjustment variable in small increments in this manner to allow for slightly different positions of the bumper in different cars of the same make, and to allow for deformation of the bumper and its mounting brackets which may occur from time to time when the car is in use.

Integrally united with the rear end of the bar 6 are a guide box 15 and an overhanging cross bar 16, the numerals 17 and 18 designating fillet welds by which the three parts may be integrally welded together from separate pieces. An upstanding lip 19 is formed on the rear end of the guide box 15 in spaced relation with the cross bar 16 whereby the lower edge of the bumper 7 may be received therebetween. The rear end of the trailer hitch is rigidly attached to the bumper by means of hanger bolts 20 having hooked upper ends which engage over the upper edge of the bumper and having threaded lower ends 21 loosely received tthrough holes in the ends of the cross bar 16 overhanging on either side of the guide box 15 and bar 6. Nuts 22 are tightened on the threaded ends 21 to clamp the device securely to the bumper with the lower edge of the bumper confined between the lip 19 and the rear edge of the bar 16, as shown in Figure 1. This type of clamp will work satisfactorily with all the various types of bumpers presently in use on automotive vehicles. It is to be understood, of course, that it is within the scope of the invention to modify the clamping parts where necessary to fit still other types of bumpers.

The guide box 15 is adapted loosely to receive a drawbar extension 23 having a plurality of holes 24, 25, and 27. The hole 24 is adapted to receive the shank of a conventional ball connector 3a, and the hole 25 is designed to receive a pin 2a on a safety chain 2b. When the hitch is in use, the hole 27 is aligned with a hole 28 in the bar 6 and a hole 29 in the guide box 15 to receive a pin 30. The projecting end of the pin 30 may be provided with an annular groove to receive a retainer in the form of a wire clip 31, or the like, or a hole may be provided in the extending end of the pin 30 to receive a cotter key or retaining pin therein. The retainer 31 in whatever form it may take may be attached to the pin 30 by a chain 32 to prevent its loss. When the trailer is disconnected and the trailer hitch is no longer needed for towing or pulling a trailer, the pin 30 may readily be withdrawn to permit the complete removal of the extension 23.

If the trailer is hitched by a simple pin connector through the end hole 24, in lieu of the ball connector 3a, the extension 23 may be telescoped within the guide box 15 when not in use. The pin 30 may be reinserted through an additional hole 26, which is positioned to hold the parts in the relative positions shown in Figure 3, wherein the outer end of the extension 23 does not extend outwardly beyond the end of the bar 6 or beyond the lip 19.

Figure 4 illustrates a modified construction for use where the automobile rear bumper is unusually low, or where for some other reason it is desired to attach and support the trailer tongue or drawbar above the lower edge of the automobile bumper. In this case there is no change in the parts attached to the automobile, but an offset extension 33 is substituted for the bar extension 23 previously described. The extension 33 comprises the two parts 34 and 35 connected together by a pair of bolts 36. By means of a plurality of registering holes 37 in vertical portions of these two members, height adjustment for the member 34 may be obtained relative to the member 35 and the bumper to which the device is attached. The elevated end of the member 34 terminates in a rearwardly extending horizontal portion having a hole 24 for receiving the shank of the ball connector 3a, and the angle in this member may be stiffened by one or more triangular webs 38. The member 34 also preferably contains a hole 25 for the locking pin 29. The lower member 35 has a hole 27 for the pin 30 which takes the drawbar pull from the trailer, and one or more stiffening webs 39 may be employed. In this embodiment the extension 34 is removed when it is not in use for towing purposes to leave the rear side of the bumper free and unobstructed. When the extension is again put into use the rolled lip 19 serves as a guide to facilitate an easy entrance into the guide box 15.

Thus, the objects of the invention are accomplished in a rugged and inexpensive construction which is readily attachable to standard makes of automotive vehicles without the use of special tools, and which incorporates in itself sufficient means of adjustment to make the device fit such vehicles without bending or deforming any parts of the vehicle and without making any material changes in the frame or bumper mounting of the vehicle. In either form of the invention, the drawbar extension is readily removable to leave no obstruction behind the rear bumper of the vehicle when the device is not actually in use for towing purposes.

Having now described my invention and in what manner the same may be used, what I claim as new and desire to protect by Letters Patent is:

1. A trailer hitch for a bumper equipped vehicle comprising a drawbar, means on one end of said drawbar for attachment to a frame member of said vehicle, means on the other end of said drawbar for attachment to the bumper of said vehicle, means for adjusting the length of said drawbar between said attaching means, a trailer connection, and means for mounting said trailer connection on said drawbar in either of two positions, said trailer connection when mounted in one of said positions extending rearwardly of said bumper for connection with a trailer and the like, and when mounted in the other of said positions being secured to said drawbar forwardly of said bumper with no part thereof extending behind said bumper.

2. A trailer hitch for bumper equipped vehicles comprising a drawbar, means for attaching one end of said drawbar to said vehicle, means for attaching the other end of said drawbar to the bumper of said vehicle, means for adjusting the length of said drawbar between said attaching means, a guide box on the bumper end of said drawbar, a drawbar extension slidably mounted in said guide box, and means for securing said drawbar extension in one position projecting rearwardly of said guide box for attachment to a trailer and in another position extending forwardly of said bumper.

3. A trailer hitch for bumper equipped vehicles comprising a drawbar, means for attaching one end of said drawbar to said vehicle, means for attaching the other end of said drawbar to the bumper of said vehicle, a guide box on said drawbar associated with said bumper attaching means, a drawbar extension slidably mounted in said guide box and removable therefrom, and quick release means for securing said drawbar extension in different adjusted positions in said guide box and for releasing said extension for removal from the guide box.

4. A trailer hitch for bumper equipped vehicles comprising a pair of longitudinal drawbar members, means for attaching one of said members to said vehicle, means for attaching the other of said members to the bumper of said vehicle, a linear series of holes in one of said members, a linear series of holes in the other member having a different spacing than said first series of holes whereby holes in said two members may be brought into registry in smaller increments of length adjustment than the spacing of the holes in either of said members, a connector insertable through registering holes in said two members for transmitting the draft from the member attached to the bumper to the member attached to the vehicle, a removable drawbar extension for a trailer coupling, and means for detachably connecting said extension to one of said members for removal therefrom.

5. A trailer hitch for bumper equipped vehicles comprising a drawbar, means for attaching one end of said drawbar to said vehicle, an upstanding lip on the other end of said drawbar, an abutment on said drawbar spaced from said lip to receive the lower edge of a bumper therebetween, clamping means arranged to engage the upper edge of a bumper to hold said lower edge between said lip and said abutment and to anchor said drawbar to said bumper, and a removable drawbar extension detachably connected with said drawbar to extend beyond the bumper for connection with a trailer and the like.

6. A trailer hitch comprising a drawbar member, means for attaching said member to a vehicle, a removable drawbar extension having a trailer coupling member, and a quick releasable pin connector arranged to secure said drawbar extension to said drawbar member when the pin is inserted and to release said extension for removal from the drawbar when the pin is withdrawn.

7. A trailer hitch for a bumper equipped vehicle comprising a drawbar member, means for attaching said member to said bumper with said bumper positioned at the extremity of said member, a guide box on said member, a removable drawbar extension receivable in said guide box, and a quick release pin connector arranged to secure said drawbar extension in said guide box and to release said extension for removal from said guide box.

8. A trailer hitch for bumper equipped vehicles comprising a drawbar, means for attaching one end of said drawbar to said vehicle, the other end of said drawbar extending to, but not beyond, said bumper, means for attaching said other end of said drawbar to the bumper of the vehicle, a removable drawbar extension having means for mounting a trailer coupling member thereon, and quick releasable means for connecting said extension with said drawbar and for releasing said extension for removal from said drawbar.

9. In a trailer hitch for a bumper equipped vehicle, a drawbar comprising a pair of drawbar members, means for attaching one end of one of said members to the vehicle, means for attaching one end of the other member to the vehicle bumper, an adjustable draft connection between said members for varying the length of the drawbar, a removable extension on said other member having a trailer coupling, and quick releasable means for detachably securing said extension to said member.

10. A trailer hitch for a bumper equipped vehicle comprising a pair of longitudinal drawbar members, means for attaching one of said members to the vehicle, means for attaching an extremity of the other member to the vehicle bumper so that the member does not extend outwardly beyond the bumper, means for connecting the two drawbar members together in variable length adjustment, a removable drawbar extension having holes therein and mounted for longitudinal adjustment on said bumper attached member, and a pin connector insertable in said holes to secure said extension selectively in extended and retracted positions on said member.

11. A trailer hitch for a bumper equipped vehicle comprising a pair of longitudinal drawbar members, means for attaching one of said members to the vehicle, means for connecting the two members together in different length adjustments, a removable drawbar extension having holes therein, a guide box for said extension on the other one of said drawbar members, said guide box and other drawbar member having holes therein, a pin connector insertable in said holes to secure said extension selectively in extended and retracted positions in said guide box, a lip on said guide box to engage the vehicle bumper, and clamping means cooperating with said lip to attach the vehicle bumper to the extremity of said other drawbar member.

BENJAMIN KOBACK.

REFERENCES CITED

The following references are of record in the file of this patent:

UNITED STATES PATENTS

| Number | Name | Date |
|---|---|---|
| 1,914,963 | Stephens | June 20, 1933 |
| 2,072,473 | Baumberger | Mar. 2, 1937 |
| 2,092,593 | Seys | Sept. 7, 1937 |
| 2,097,006 | Weis | Oct. 26, 1937 |
| 2,150,999 | Wight | Mar. 21, 1939 |
| 2,151,920 | Jandus et al. | Mar. 28, 1939 |
| 2,309,850 | Klawitter | Feb. 2, 1943 |